United States Patent [19]

Pfaff

[11] Patent Number: 5,228,396
[45] Date of Patent: Jul. 20, 1993

[54] APPARATUS FOR CULTURING PLANT MATERIALS AS FOODS

[76] Inventor: Gunter Pfaff, 14780 Beardslee Rd., Perry, Mich. 48872

[21] Appl. No.: 871,065

[22] Filed: Apr. 20, 1992

[51] Int. Cl.⁵ .................... A23L 1/20; A23L 3/00; A23L 3/10
[52] U.S. Cl. ........................ 99/470; 99/453; 99/467; 99/473; 99/483; 99/536; 261/121.1; 261/124; 422/300; 422/305; 422/307
[58] Field of Search .............. 99/323.1, 453, 467–470, 99/473, 476, 483, 484, 487, 516, 534, 536; 366/101, 106, 107; 261/124, 126, 121.1, DIG. 7, DIG. 16, DIG. 30, DIG. 76; 219/401; 422/297, 300, 302, 305, 307, 231

[56] References Cited

U.S. PATENT DOCUMENTS

| | | |
|---|---|---|
| 1,513,174 | 10/1924 | Kruger . |
| 3,228,773 | 1/1966 | Hesseltine et al. . |
| 3,243,301 | 3/1966 | Hesseltine et al. . |
| 3,874,279 | 4/1975 | Sakita et al. .............. 99/516 X |
| 3,933,953 | 1/1976 | Leva ......................... 261/113 |
| 3,981,234 | 9/1976 | Nelson et al. . |
| 4,013,869 | 3/1977 | Orts . |
| 4,076,617 | 2/1978 | Bybel et al. .............. 261/124 |
| 4,189,504 | 2/1980 | Jimenez .................... 99/536 |
| 4,248,141 | 2/1981 | Miller, Jr. . |
| 4,534,283 | 8/1985 | Nakamuta ................. 99/483 X |
| 4,563,277 | 1/1986 | Tharp ....................... 210/124 X |
| 4,769,221 | 9/1988 | Marihart ................... 422/231 |
| 4,771,681 | 9/1988 | Nagata ..................... 99/453 X |
| 4,848,216 | 7/1989 | Robau . |
| 5,015,394 | 5/1991 | McEllhenney et al. .... 261/124 X |
| 5,133,249 | 7/1992 | Zittel ........................ 366/107 X |
| 5,142,969 | 9/1992 | Chun ........................ 99/470 |

FOREIGN PATENT DOCUMENTS

| | | |
|---|---|---|
| 1274428 | 8/1968 | Fed. Rep. of Germany ........ 99/483 |
| 3604808 | 8/1987 | Fed. Rep. of Germany ........ 99/470 |
| 2145004 | 3/1985 | United Kingdom ................ 261/124 |

OTHER PUBLICATIONS

Discusses inoculum enrichment by natural selection as an alternative to pure culture starters (Unknown as to Source and Date).
Shurtleff & Aoyagi (1980) Tempeh Production, The Book of Tempeh: vol. II, published by New-Age Foods pp. 46-50.
Soyfoods, Vegetarian Times, pp. 35-39, Nov. 1987.

Primary Examiner—Timothy F. Simone
Attorney, Agent, or Firm—Ian C. McLeod

[57] ABSTRACT

An incubator apparatus (10) for preparing an aerobically cultured plant material, such as a soyfood substrate (11), inoculated with a beneficial microorganism to form a cultured food, such as Tempeh, is described. The incubator apparatus is comprised of a water tray (13), which provides a water bath (15) for heating the inoculated soyfood substrate loaded in shallow metal trays (45), preferably stainless steel trays. The trays are then supported on tray racks (43) that are mounted in the water bath so that the trays are partially immersed in the water bath. The trays holding the inoculated soyfood substrate are then sealed in the water bath by a cover (61). The cover mounts over the tray racks and is partially immersed in the water bath to seal the cover over and around the trays filled with the inoculated soyfood substrate. An aerating supply system (31) provides for the aerobic culturing of the soyfood substrate while a circulating pump (100) provides a uniform distribution of the water bath throughout the water tray. A sensor (132) and a controller (104) actuate a temperature control system to effect heating and cooling of the water bath as needed to promote the growth of the microorganisms on the soyfood substrate. Later, a heating system (17) is used to elevate the temperature of the water bath to stop the culturing process by killing the microorganisms and to pasteurize the cultured food. The cultured food is then cooled and removed from the trays as a ready to eat food that can serve as an alternative to meat. The Tempeh is high in protein content and high in fiber without having cholesterol.

22 Claims, 6 Drawing Sheets

APPARATUS FOR CULTURING PLANT MATERIALS AS FOODS

BACKGROUND OF THE INVENTION (1) Field of the Invention

The present invention relates to an incubator apparatus and a method for preparing an aerobically cultured food from a plant material. In particular, the present invention relates to an incubator apparatus and a method for aerobically culturing a plant material, primarily soybeans, provided with a beneficial microorganism, preferably a fungus of the genus Rhizopus, to prepare a Tempeh. The soybean can also be extended with a portion of barley cereal grain or other cereal grains.

The incubator apparatus is comprised of a container for a water bath. A water circulation means having a sensor controlled heater coil as a first heater means warms the water bath during the first half of the incubating process and causes the water bath to flow throughout the container. This helps to maintain uniformity of temperature in the water bath while the plant material is being aerobically cultured to form the Tempeh. The sensor also controls the cooling of the water bath during the second half of the incubation process. A second heater means is mounted in the container for heating the water bath to a high temperature.

To prepare the Tempeh, shallow metal trays, preferably made of stainless steel, are filled with the plant material and supported on racks so that the trays are partially immersed in the water bath. The trays are preferably arranged side-by-side on the racks as units and a plurality of racks are mounted in parallel in the water bath. The trays can be of various sizes, although it is preferred that they have a depth of about 1 inch (2.54 cm) and the plant material is provided in the trays up to a depth of about 0.75 inches (1.9 cm). A removeable lid or cover mounts over and around the trays filled with the plant material. The cover can be a single, continuous member covering all of the tray units in the water bath, or there can be individual covers, preferably for each side-by-side tray unit. A lower rim portion of the cover is immersed in the water bath to seal the cover over and around the trays. An aerating means is centrally located in the water bath between each side-by-side tray unit so that an airflow bubbles up through the water bath and moves over the plant material held in the trays. The airflow exits through perforations provided in the cover, away from the aerating means. During the culturing process, the microorganisms aerobically grow to produce enzymes that act on the proteins, carbohydrates and the oil in the plant material. Tempeh produced in the incubator apparatus is a palatable and nutritious food that can be eaten as is or further prepared by cooking.

After the microorganisms have cultured the plant material, the second heater means is used to elevate the temperature of the water bath beyond that which is suitable for growth of the microorganisms. This kills the microorganisms and pasteurizes the plant material. The trays are then uncovered to cool the cultured food, and the cultured food is cut into useable portions and packaged for later consumption.

(2) Prior Art

For centuries in Asiatic cultures and particularly in Indonesia, Tempeh has been a valuable and important food produce prepared by fermenting and culturing whole dehulled soybeans or soybean grits or meal with pure cultures of beneficial fungi or microorganisms. Tempeh is an important food in Asiatic cultures because soybeans grow readily in moderate climates and because soybeans contain proteins, carbohydrates, fats, vitamins and other nutrients, but have no cholesterol.

Historically, Tempeh is prepared in small scale operations by first soaking whole soybeans in water. The soaked, wet soybeans are then dehulled and boiled in water to soften the beans and destroy any contaminating microorganisms. The cooked soybeans are then spread out in thin layers to allow the water to drain and evaporate from the surface of the soybeans. The air dried soybeans are then mixed with a starter comprising portions of old Tempeh containing a mixture of molds, bacterial and other microorganisms. The moist inoculated soybeans are then wrapped tightly in banana leaves and the material is allowed to culture at room temperature until the soybeans are completely molded. This product is known as Tempeh, which can be eaten as is or sliced into thin slices, dipped into a salt solution and fried in a vegetable oil.

The culturing of soybeans destroys the bad odor and bad flavor of soybeans by apparently causing the microorganisms to produce enzymes that act on the proteins, carbohydrates and the oil in the soybeans to make the Tempeh palatable and nutritious and to give a desirable flavor. The microorganisms mainly responsible for Tempeh culturing are stated to be *Rhizopus oryzae* and *Aspergillus oryzae*. These microorganisms require aeration for growth and the formation of enzymes.

The prior art culturing of soybeans to make Tempeh has numerous objectionable steps. Since the microorganisms responsible for Tempeh are aerobic, during the culturing process the soybeans must be spread out in layers that are relatively shallow in depth. This means that the area of the soybean layers must be large. Thus, the use of large area trays has proliferated in recent times for commercial production of Tempeh. Martinelli and Hesseltine (1964) Food Technology, Vol. 18, No. 5 found that large metal trays were excellent for commercial Tempeh production because they were more sanitary and allowed for easier removal of the Tempeh from the container in comparison to wooden trays (unless the wooden trays were lined with perforated plastic sheeting). The metal trays were reported to preferably be large aluminum trays instead of large stainless steel trays. However, the use of aluminum in prolonged contact with food is being questioned in relation to its possible implication in causing Alzheimer disease. Since stainless steel is a poor heat conductor, having less than 10 percent of the thermal conductivity of aluminum, there tends to be a build-up of heat at the center of the tray that causes spoilage there. Plastic school lunch trays can also be used as Tempeh containers if the tray material is approved for contact with fermenting foods.

In the prior art methods, the layers of soybeans must also be covered by some film. The use of banana leaves is extremely primitive, can cause contamination and is limited to those areas tropic enough to support growth of banana trees. More recently, Martinelli and Hesseltine (1964), discussed previously, have suggested the use of a thin sheet of polyethylene film, which is perforated every 2 to 3 inches with a nail. The soybeans can also be covered with a reusable sheet of stronger polyethylene, rigid Plexiglas ® or an imperforated sheet of wax paper.

Using an inoculum consisting of a portion of old Tempeh is very unsanitary. The old Tempeh can be contaminated by a variety of molds, bacteria and yeasts, and this method of preparation is practiced at the expense of the nutritional benefit of the Tempeh. Also, since the inoculum is highly variable as to the viability of the mold even when the inoculum is relatively pure, culturing time requirements for the Tempeh are extremely variable, as is the product itself.

The most commonly practiced prior art method of making Tempeh consists of incubating a layer of soybeans covered with a flexible plastic sheet modified with aeration perforations. The incubation process takes place in an incubation room having an agitated airflow that is uniformly heated or cooled and with a consistent humidity. The problem is that agitation of the airflow often leads to blackened areas on the Tempeh where the airflow meets the microorganisms at the perforated holes. This contact with the fast moving airflow causes the microorganisms to sporulate prematurely and produces undesirable black spores. The greater the agitation of the airflow to ensure that the air in the incubation room does not stratify, the greater the occurrences of premature sporulation. Furthermore, it is difficult to accurately control the humidity in the incubation rooms. If the airflow is slightly drier than optimum, the black spore problem is increased. There is thus a need for Tempeh and other fermented foods having a more uniform appearance and useful shape (most of the Tempeh produced today is incubated in 8 ounce perforated plastic bags). There is also a need for the Tempeh to be pasteurized and ready to be consumed.

U.S. Pat. No. 3,228,773 to Hesseltine et al describes an improved method of preparing Tempeh by fermenting soybeans with certain phycomycetous fungi of the order Mucorales, genus Rhizopus. The soybeans are soaked overnight, the seed coats are removed and the whole soybeans may be cracked into large grits. The soybeans are then softened and moistened by soaking in water and then boiled to sterilize and further soften the soybeans. Excess water is drained and the soybeans are cooled below 104° F. (40° C.) and then inoculated with a spore suspension of Rhizopus spores. Species of this genus which are operative to give acceptable results include *Rhizopus oligosporus, R. arrhius, R. acglamydosporus, R. formosaensis, R. stolonifer* and *R. oryzae*. The soybeans are then cultured at a temperature of between 77° and 99° (25° to 37° C.). The soybeans are cultured in conventional non-toxic, plastic bags modified by the presence of 0.02 inch diameter perforations located not over 0.5 inches apart. The soybeans are also described as being cultured in perforated flexible, plastic tubing having a diameter of 3.5 inches (9 cm). In either example, the resulting Tempeh must be removed from the plastic container and then cooked to prepare the Tempeh as a consumable food. There is a need for Tempeh and other fermented foods which are pasteurized and ready to be consumed as a food.

U.S. Pat. No. 3,243,301 to Hesseltine et al describes a process of making a novel variety of Tempeh, not exclusively from soybeans. The novel Tempeh is made by subjecting cereal grains such as wheat, rye, rice, barley and oats or mixtures of the same, alone or in combination with pre-treated soybean grits, to the action of the mold *Rhizopus oligosporus*. This mold is characterized by the presence of large amounts of both proteolytic and lipolytic enzymes, but little or no amylolytic enzyme. Any appreciable amount of the latter class of enzyme would break down the cereal grain starch to simpler sugars that would then be fermented to disagreeably tasting organic acids and highly colored materials. Thus, the closely related fungis *Rhizopus oryzae* and the mold Aspergillus oryzae on substrates comprising a cereal grain produce darkly colored, ill-smelling, and unacceptable products.

U.S. Pat. No. 3,981,234 to Nelson et al describes an apparatus for the preparation of a soybean beverage base. This apparatus produces a relatively coarse ground slurry consisting of water and approximately 12 percent by weight of soybean tissue.

U.S. Pat. No. 4,248,141 to Miller. Jr. describes a method and apparatus for debittering soybeans caused by enzymes lying next to the bean surface directly beneath the skin. The end product is dry, dehulled soybean halves, suitable for the usual raw soybean use.

Shurtleff & Aoyagi describe the process of making Tempeh in *Tempeh Production, The Book of Tempeh:* Volume II, published by New-Age Foods, 1980. Tempeh is also discussed in *Soyfoods, Vegetarian Times,* pages 35 to 39, November 1987.

Other prior art less directly related to the present invention includes U.S. Pat. Nos. 1,513,174 to Kruger, 4,013,869 to Orts and 4,848,2161 to Robau. Kruger describes a grain soaker wherein grain held in the soaker can be immersed in water for a period of time and afterwards raised and permitted to drain. Orts describes a tortilla warmer and hydrator. The device is particularly useful for warming and hydrating tortillas that have been cooked at an earlier time and have subsequently become cold and hard. Robau describes a steam-heated milk warmer.

What is needed is a method and an incubator apparatus for the commercial production of a pasteurized Tempeh from a plant material, which is preferably soybeans. The cultured product needs to be produced in a consistent manner, in a useful shape and be reproducible on a large scale.

OBJECTS

It is therefore an object of the present invention to provide an incubator apparatus for producing a cultured food, particularly Tempeh from a soybean substrate. Further, it is an object of the present invention to provide a method of culturing a plant material to produce a Tempeh or other cultured food. Still further, it is an object of the present invention to produce a pasteurized food that is suitable for immediate consumption by an end user. Furthermore, it is an object of the present invention to provide an incubator apparatus for producing a cultured food, which serves as a good source of protein and calcium, and that is low in calories and devoid of cholesterol. Finally, it is an object of the present invention to provide an incubator apparatus that is relatively inexpensive to build and easy to construct and that is able to produce commercial quantities of a high quality cultured food, which is nutritious and appealing to the taste. These and other objects will become increasingly apparent by reference to the following descriptions and to the drawings.

GENERAL DESCRIPTION

The present invention relates to an apparatus adapted for culturing a plant material with a microorganism to produce a cultured food, which comprises: an open container means adapted for holding a water bath; shallow tray means with a flat portion surrounded by sides supported in the container means and holding a quantity of the plant material spread over the bottom of the tray means, wherein the tray means is mounted in the container means so as to be partially immersed in the water bath in the container means with the bottom of the tray means in the water bath; heater means for evenly heating the water bath in the container means; circulation means which evenly regulates the temperature of the water bath in the container means; aerating means providing an airflow in the container means; and lid means mounted in the container means are sealed over and around the tray means, the lid means having perforations that provide for the airflow from the aerating means to move over the plant material held in the tray means and out the lid means, through the perforations to aerate the plant material wherein the heater means and the circulation means maintain the water bath in the container means at a first water temperature so that the plant material is at a culturing temperature that is suitable for cultivation of the microorganisms while the plant material is being aerated by the airflow from the aerating means to produce the cultured food.

Also, the present invention relates to a method for culturing a plant material with a microorganism to produce a cultured food, which comprises: providing a culturing apparatus, which comprises: an open container means adapted for holding a water bath; shallow tray means with a flat bottom surrounded by sides and supported in the container means and holding a quantity of the plant material spread over the bottom of the tray means, wherein the tray means is mounted in the container means so as to be partially immersed in the water bath in the container means with the bottom of the tray means in the water bath; heater means for evenly heating the water bath in the container means; circulation means which evenly regulates the temperature of the water bath in the container means; aerating means providing an airflow in the container means; and lid means mounted in the container means and sealed over and around the tray means, the lid means having perforations that provide for the airflow from the aerating means to move over the plant material held in the tray means and out the lid means, through the perforations to aerate the plant material held in the tray means; mounting the tray means holding the plant material in the container means, partially immersed in the water bath; sealing the lid means over and around the tray means; maintaining the water bath with the heater means and circulation means at a first water temperature so that the plant material in the tray means is at a culturing temperature that is suitable for culturing the microorganism with the airflow from the aerating means to produce the cultured food from the plant material; removing the lid means from over and around the tray means; and moving the tray means from the container means.

The use of the term "plant material" refers to materials of vegetable origin.

When soybeans provide the plant material, the soybeans are preferably dehulled, soaked, partially precooked, inoculated with beneficial mold microorganisms and then filled in shallow metal trays. Barley cereal grain or other cereal grains can also be added to the soybeans as an extender. This mixture is then cultured by partially submersing the trays in a heated water bath under aerobic conditions. The water bath provides for even heating or cooling and uniform culturing of the mold on the soybeans over the entire area of the tray. This provides for the inoculated soybeans to be evenly cultured throughout the areal extent of the soybeans in the shallow metal trays, which is important in order to sustain a large scale, commercial production facility. After the soybeans are finished culturing to form the Tempeh, the mold is killed by elevating the temperature of the water bath above that which the mold microorganisms are viable. This also serves to pasteurize the Tempeh, which can then be sectioned into useable portions, packaged and supplied to end users. Since the Tempeh has previously been pasteurized during the mold killing step, the Tempeh can be consumed as is or incorporated into other dishes, serving as a nutritious, cholesterol free alternative to meat.

SPECIFIC DESCRIPTION

FIGS. 1 to 7 show the preferred incubator apparatus 10 of the present invention for aerobically culturing a plant material such as a soyfood substrate 11 (FIGS. 5 and 6) so that the soyfood substrate 11 cultures to form a Tempeh.

The following Example is illustrative of the procedure for producing the soyfood substrate 11.

EXAMPLE 1

In this culturing process, dehulled, whole bean halves of corsoy variety soybeans were used. The soybean halves were soaked overnight in tap water heated to the boiling point, 212° F. (100° C.), then allowed to cool to room temperature. About 4.73 liters (1.25 gallons) of water was used for every 1,000 grams (2.2 pounds) of soybean material. The soaking water was discarded and the soybeans were then boiled without pressure in excess water for 45 minutes. The water was drained, and the soybean halves were put into a stainless steel mixer and stirred until they came to room temperature, 860 grams (1.89 pounds) of vinegar were added while the soybeans were mixing. The soybeans were now swollen and soft. Then the soybeans were inoculated with spores of the mold *Rhizopus oligosporus*, which were slowly added from a shaker.

The whole soybean halves can be produced by cracking the beans and blowing off the hulls, or the soybeans halves can be purchased from a wholesaler such as Strayer Seed Farm, Inc., Hudson, Iowa. The mold culture can be obtained from Gem Cultures, Fort Bragg, Calif.

EXAMPLE 2

The soybeans were soaked and boiled as in Example 1 and then combined with 159 grams (0.35 pounds) of barley cereal grain for every 1,000 grams (2.2 pounds) of soybeans. The pearled barley is added 28 minutes before the end of the cooking period of the soybeans. This combination is thoroughly mixed with vinegar added and then inoculated with the mold *Rhizopus oligosporus* as previously described in Example 1. The barley cereal grain can be obtained from wholesalers such as Daily Grind, Ann Arbor, Mich.

Figure 1:
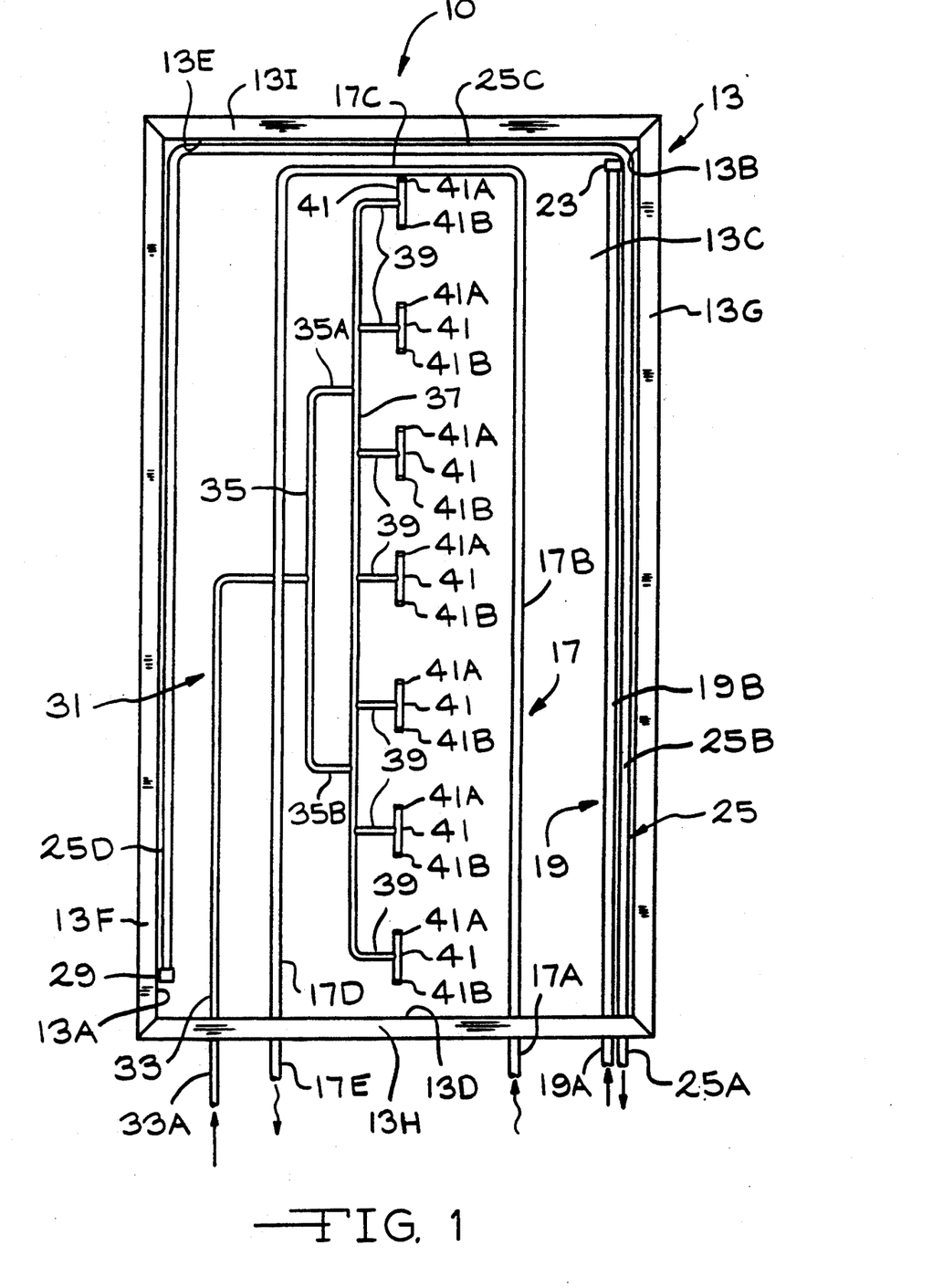
FIG. 1 is a plan view of a water tray 13 of the incubator apparatus 10 of the present invention having a steam line 17, a water inlet line 19 and a water outlet line 25.
Figure 2:
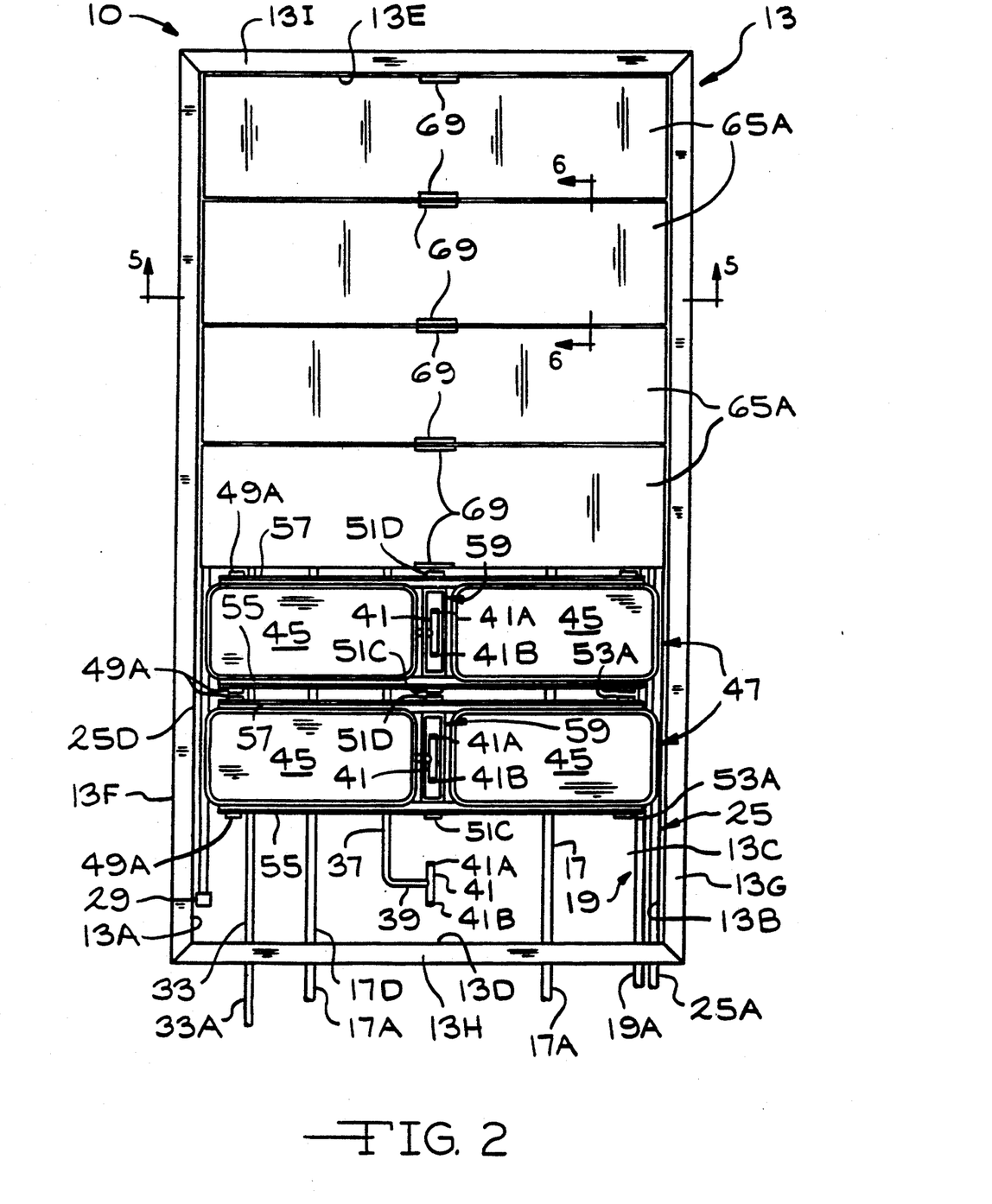
FIG. 2 is a plan view of the water tray 13 of the incubator apparatus 10 of the present invention shown in FIG. 1 and showing two units 47 of side-by-side trays 45 for holding the soyfood substrate 11 and showing a plurality of covers 61 mounted on tray racks 43 that support the trays 45 in the water bath 15 provided by the water tray 13.

The apparatus for fermenting the soybeans of Examples 1 and 2 shown in FIGS. 1 and 2, the incubator apparatus 10 is comprised of a water tray 13 filled with water 15 (FIGS. 5 and 6) to provide a water bath and having a generally rectangular shape in plan view. The water tray 13 is preferably supported above ground level by leg supports (not shown) and includes spaced apart sidewalls 13A and 13B extending upwards from a base wall 13C with opposed end walls 13D and 13E between the sidewalls 13A and 13B. Right angled extensions 13F and 13G extend horizontally outward from the upper end of sidewalls 13A and 13B (FIG. 5) and similarly, right angled extensions 13H and 13I extend horizontally outward from the upper end of end walls 13D and 13E. The extension members 13F, 13G, 13H and 13I serve as a ledge or mantle around the outer periphery of the water tray 13. Preferably, the water tray 13 is made of a metal material, such as stainless steel or a galvanized metal that will not rust and that is easily cleaned and sanitized. The water tray 13 can also be made of a plastic material, or even wood lined with a metal or plastic liner.

As shown in FIGS. 1 and 2, the water tray 13 is provided with a steam line 17, that is U-shaped in plan view. An inlet side 17A of the steam line 17 is connected to a steam source (not shown) upstream from the point where the steam line 17 enters the water tray 13 through the end wall 13D, adjacent to sidewall 13B. A downstream portion 17B extends substantially the length of the sidewall 13B to a lateral portion 17C that extends partially along the end wall 13E. The lateral portion 17C leads to a return portion 17D that extends along the length of the opposed sidewall 13A and exits the end wall 13D, adjacent the sidewall 13A. The return portion 17D then leads to an outlet side 17E that connects back to the steam source. The steam line 17 is preferably provided with a manually operated valve (not shown) for introducing steam into the steam line 17. This serves to raise the temperature of the water bath 15° to about 175° F. (79.4° C.) to stop the culturing process by killing the *Rhizopus oligosporus* microorganisms and to pasteurize the Tempeh, as will be explained hereinafter. The steam line 17 is preferably made of stainless steel tubing, although any other conduit material that does not deteriorate when exposed to steam is suitable. It should be understood that although the stainless steel steam line 17 is preferred as the heating means, the heating means could also be provided by an electrical heating coil (not shown) or some other suitable heating device.

As shown in FIGS. 1 and 2, a water inlet line 19 having an inlet end 19A enters the water tray 13 through the end wall 13D. The water inlet line 19 has a perforated section 19B having openings 21 and extends along the sidewall 13B to an end cap 23. The inlet end 19A of water inlet line 19 is connected to the pressure side of a pump 100, which is shown in the schematic in FIG. 9 and provides a circulation means for moving water through the openings 21 in the perforated section 19B and into the water bath 15. As represented in cross-section in FIG. 7, the openings 21 are located at approximately the nine o'clock position when viewed along the length of the perforated section 19B from the inlet end 19A to the end cap 23. Preferably, the openings 21 are spaced at uniform intervals to provide one (1) opening 21 per tray 45 position along the length of the perforated section 19B of the water inlet line 19, as will be hereinafter described in detail.

FIGS. 1 and 2 also show a water outlet line 25 that serves for drawing water out of the water tray 13. The water outlet line 25 has an outlet end 25A that exits the water tray 13 through the end wall 13D, directly adjacent to the sidewall 13B and that connects to the pump 100 (FIG. 9) tied in with the water inlet line 19. A first imperforate section 25B extends from the outlet end 25A and along the sidewall 13B to a second imperforate section 25C extending along the end wall 13E. In this position, the first imperforate section 25B is between the sidewall 13B of water tray 13 and the perforated section 19B of the water inlet line 19. The second imperforate section 25C leads to a perforated section 25D having openings 27 (FIG. 7A) spaced at regular intervals along the length of the section 25D. The perforated section 25D terminates at an end cap 29, adjacent to the end wall 13D. The outlet end 25A of the water outlet line 25 is connected to the vacuum side of the pump 100 (FIG. 9), which as previously mentioned is also connected to the water inlet line 19 so that water drawn out of the water tray 13 through the water outlet line 25 is recirculated into the water bath 15 through the water inlet line 19. Preferably, this circulation is continuous. A filter (not shown) can also be connected to the pump 100 for filtering the water before it is recirculated back into the water bath 15, although this is not necessary to practice the full scope of the present invention.

Figures 5, 6, 7, 7A:
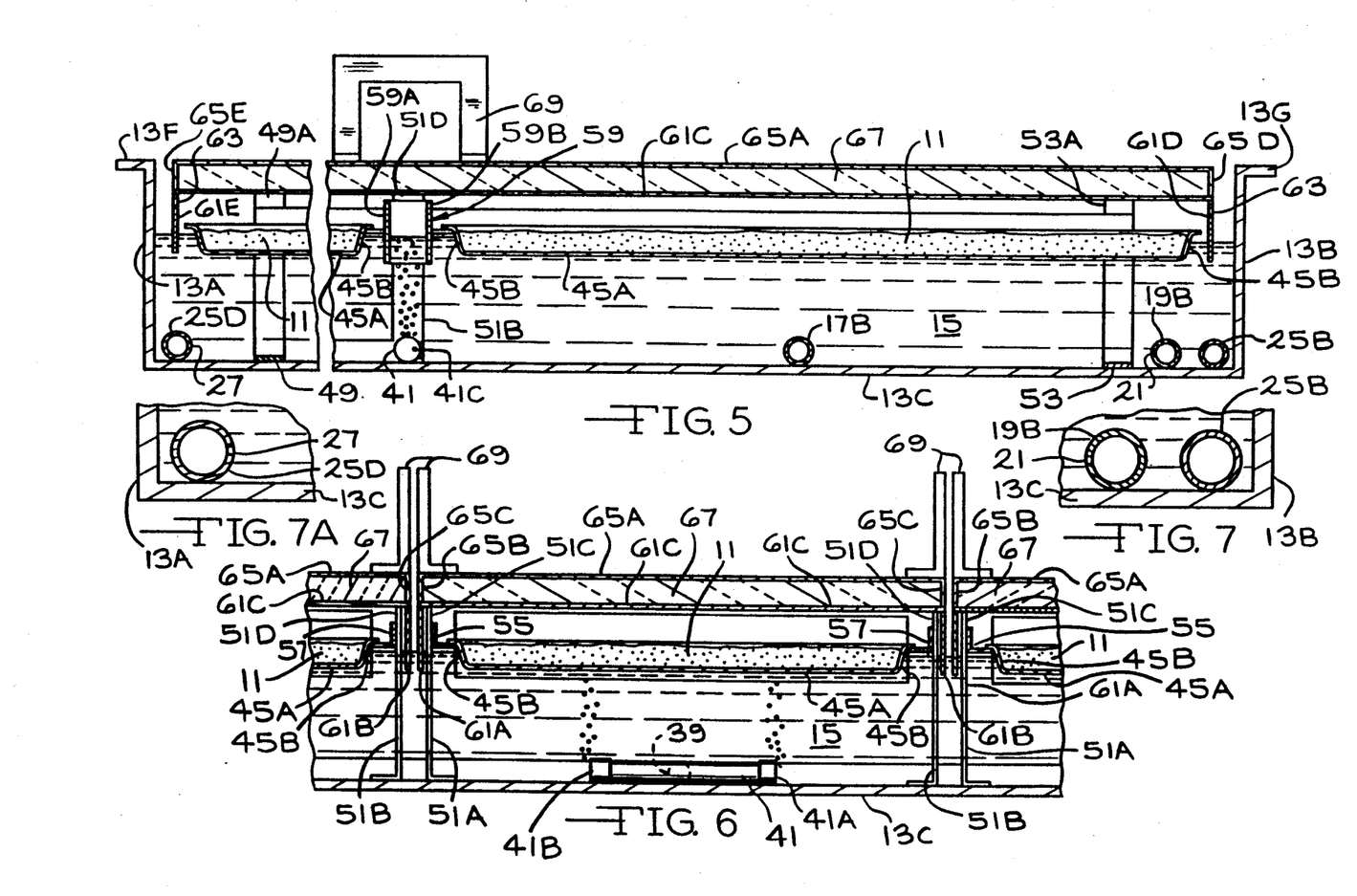
FIG. 5 is a cross-sectional view along line 5—5 of FIG. 2 showing a unit 47 of trays 45 supported in the water bath 15 by the tray rack 43 and with the cover 61 sealed around the trays 45 to form the incubator apparatus 10 of the present invention.
FIG. 6 is a cross-sectional view along line 6—6 of FIG. 2 partially showing a plurality of trays 45 supported in the water bath 15 by respective tray racks 43 and with respective covers 61 sealed around the trays 45 to form the incubator apparatus of the present invention.
FIG. 7 is an enlarged view of a portion of FIG. 5 showing the water inlet line 19B with opening 21 and the water outlet line 25B.
FIG. 7A is an enlarged view of a portion of FIG. 5 showing the water outlet line 25D with opening 27.

As represented in cross-section in FIG. 7, the water outlet line 25 is provided with openings 27 along the length of the perforated section 25D. As viewed along the perforated section 25D from the end cap 29 to the imperforate section 25C, the openings 27 are located at approximately the three o'clock position and are spaced at uniform intervals to provide one (1) opening 27 per tray 45 position along the length of the perforated section 25D of line 25, as will be hereinafter described in detail. That way, the perforated section 19B of the water inlet line 19 serves to direct the water bath 15 across the width of the water tray 13 from sidewall 13B to the perforated section 25D mounted next to the sidewall 13A. This serves to maintain the water bath 15 in a well circulated condition so that the temperature of the water bath 15 is uniform around the areal extent of the water tray 13. Both the water inlet line 19 and the water outlet line 25 are preferably made of copper tubing although any other conduit material that does not deteriorate when exposed to heated water and that is easily cleaned is suitable for practicing the full scope of the present invention.

Figure 9:
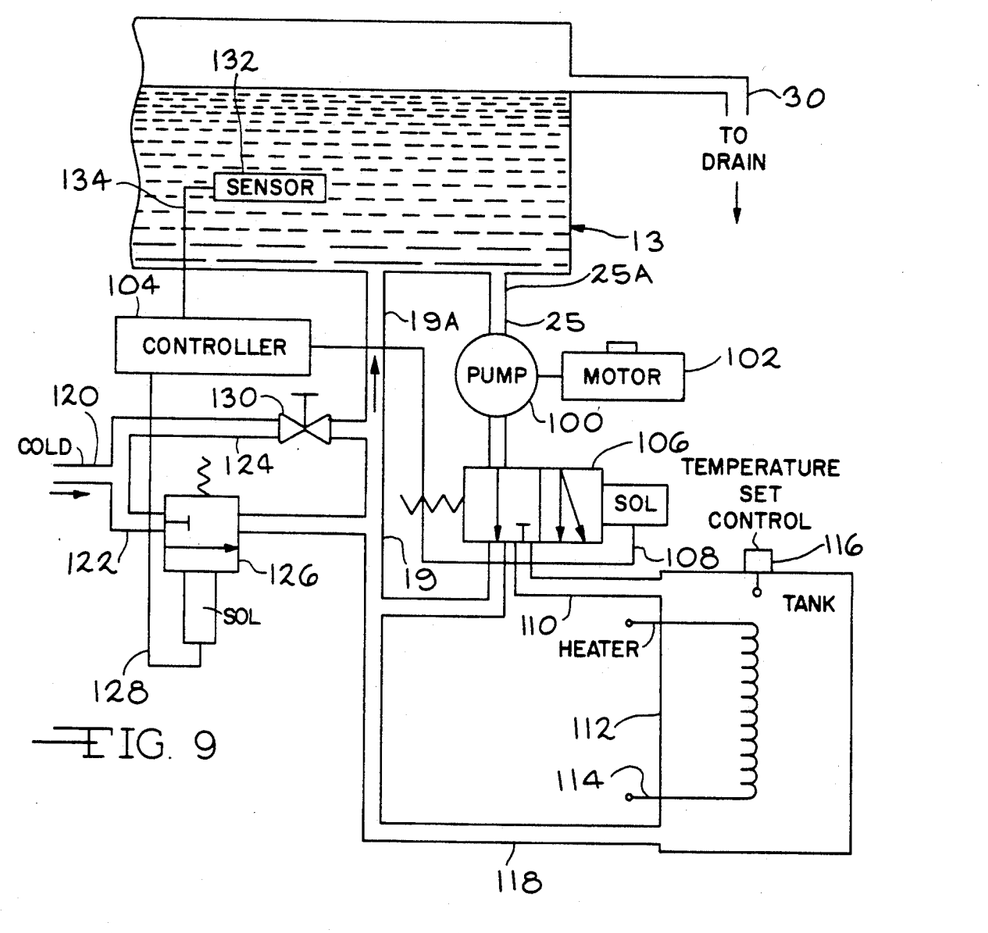
FIG. 9 is a schematic view of the circulation and automatic temperature control system for the incubation apparatus shown in FIG. 1 showing the hot water tank 116 and the cold water line 126 controlled by a controller 104 in response to signals from a sensor 140 mounted in the water tray 13.

FIG. 9 is a schematic view of the temperature control for the water bath 15. The water inlet line 19 leads from the pressure side of pump 100 to the inlet end 19A, which enters the water tray 13 through the end wall 13D. The outlet end 25A of the water outlet line 25 exits the water tray 13 through the end wall 13D, directly adjacent to the sidewall 13B, and connects to the suction side of the pump 100. The pump 100 is driven by a motor 102. The pump 100 preferably runs continuously so that water is always circulating through the water bath 15.

A spring return solenoid valve 106 is mounted in the water inlet line 19 and is actuated by the controller 104 through cable 108. Other types of automatically controlled valves are also contemplated by the scope of the present invention. The solenoid valve 106 is connected to a water line 110 leading to a water tank 112 provided with a heater coil 114. The water tank 112 has a temperature control mechanism 116 that serves as a dial so that the temperature of the water in the water tank 112 can be set at a desired temperature. An outlet line 118 leads from the water tank 112 and connects into the water inlet line 19 leading into the water tray 13.

A cold water line 120 leading from a cold water source (not shown) leads to a T-connection that branches into a first cold water line 122 and a second cold water line 124. Cold water line 122 has an inline spring return solenoid valve 126 connected to controller 104 by cable 128. The cold water source preferably provides water having a temperature of about 40° F. (4.4° C). As will be explained hereinafter in detail, the second half of the culturing process of the soyfood substrate 11 is an exothermic reaction which creates heat that raises the temperature of the water bath 15. Thus, the cold water line 122 is used to trickle a small quantity of cooling water into the water tray 13 in response to a sensor 132 in the water bath 15. The sensor 132 sends signals to the controller 104 via cable 134 so that the controller 104 operates the valve 126 to regulate the trickle of cooling water flowing through the cold water line 122 into the water inlet line 19 and into the water tray 13. This way, the temperature of the water bath 15 in the water tray 13 can be controlled within a strict temperature range to provide an optimum temperature in the incubator apparatus 10 during the culturing process.

The second cold water line 124 is provided with a manually operated valve 130 that enables relatively large quantities of cold water to be piped into the water bath 15 in the water tray 13. This is used to cool the temperature of the water bath 15 after it has been raised above 140° F. (60° C.) to kill the *Rhizopus oligosporus* microorganism and to pasteurize the Tempeh, as will be described hereinafter. As shown in FIG. 9, the second cold water line 124 is also used to bring the level of the water bath 15 in the water tray 13 to the proper level (just exiting a drain line 30 provided on the water tray 13).

Figure 8:
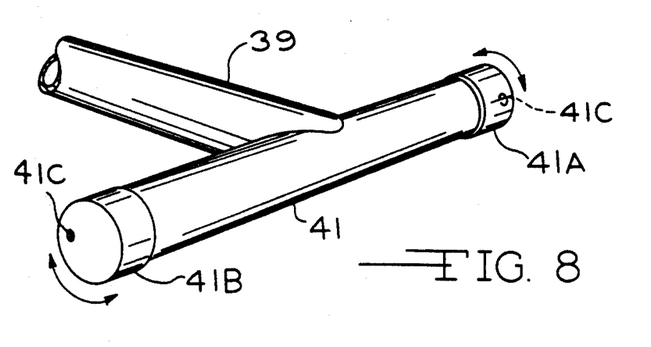
FIG. 8 is an isometric view of the rotatable end caps 41A and 41B of the air supply system 31.

FIGS. 1 and 2 further show an air supply system 31 comprised of a main air inlet line 33 entering the water tray 13 through the end wall 13D, adjacent to the sidewall 13A, and having an inlet end 33A connected to an air pump (not shown). The air pump can be provided with an air filter, if desired. The main air inlet line 33 extends about half the distance along the length of the sidewall 13A where it connects into a first manifold 35 that separates into spaced apart lateral open ends 35A and 35B. The lateral open ends 35A and 35B of manifold 35 are positioned about one-quarter and three-quarters of the distance along the length of the water tray 13, respectively. Both lateral open ends 35A and 35B of the first manifold 35 in turn connect into a second manifold 37 that diverges into seven tail lines 39, spaced at equal distances along the length of the second manifold 37. Each of the tail lines 39 in turn connect to fittings 41 having spaced apart rotatable end caps 41A and 41B (FIG. 8) having off center openings 41C (FIG. 6) that serve as adjustable air outlets for bubbling air through the water bath 15. By rotating the end caps 41A and 41B, the off center openings 41C can be positioned so that the trail of airflow from the end caps 41A and 41B can be adjusted. That way, the air supply system 31 provides part of the aerating system for aerobically culturing the inoculated soyfood substrate 11 to form a Tempeh, as will hereinafter be described in detail. The conduits forming the various portions of the aerating system 31 are preferably made of polyvinyl chloride (PVC) tubing, although any other conduit material that does not deteriorate when exposed to heated water and air and that is easily cleaned is suitable for practicing the full scope of the present invention.

Figure 3:
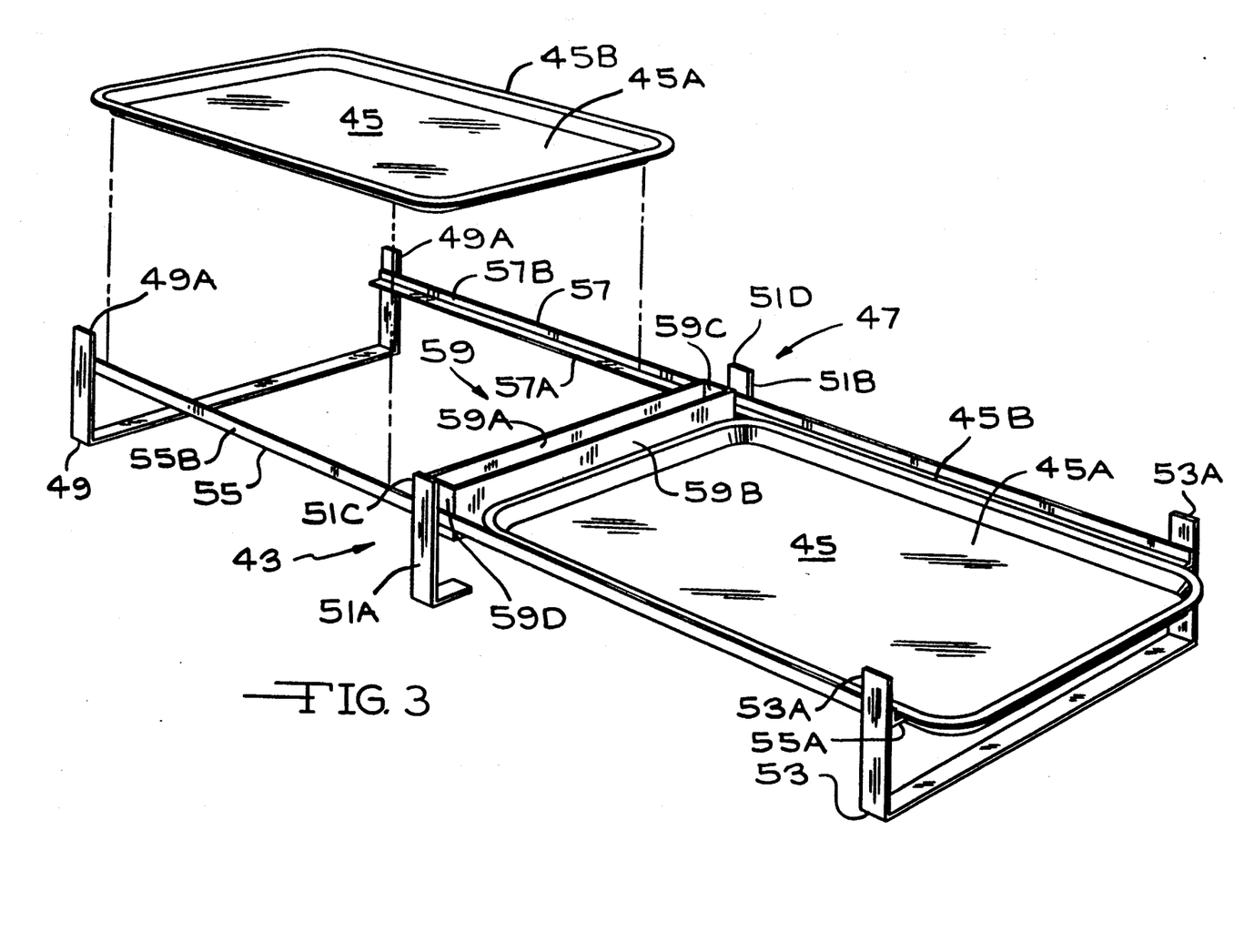
FIG. 3 is a left side perspective view of the tray rack 43 that provides for supporting a pair of side-by-side trays 45 as a unit 47 in the water bath 15 of the incubator apparatus 10 of the present invention.

As shown in FIGS. 2 and 3, tray racks 43 are removeably mounted in the water tray 13 and serve to support a pair of side-by-side trays 45 partially immersed in the water bath 15. One tray rack 43 along with the side-by-side trays 45 are referred to as a tray cell or unit 47. As particularly shown in FIG. 3, the tray rack 43 is comprised of spaced apart leg members 49, 51A, 51B and 53 connected to opposed rail members 55 and 57. The end leg members 49 and 53 have an elongate U-shape while the middle legs 51A and 51B are L-shaped members. The opposed rail members 55 and 57 are formed from right-angle irons having L-shaped cross-sections. The rails 55 and 57 are mounted on the inside of the legs 49, 51A, 51B and 53 so that the base portions 55A and 57A of the rails 55 and 57 extend inwardly along a horizontal plane towards each other. The end legs 49 and 53 are mounted at the opposed ends of the rails 55 and 57, while the middle legs 51A and 51B are mounted at a mid-point along the length of the rails 55 and 57 and serve as middle braces for the tray rack 43. In this position, the upstanding portions 49A, 51C, 51D and 53A of the legs 49, 51A, 51B and 53 extend above the vertical sides 55B and 57B of the rails 55 and 57 (FIGS. 5 and 6).

As further shown in FIGS. 2 and 3, an aerating guide 59 completes the tray rack 43. The aerating guide 59 has an elongate, rectangular shape comprised of spaced apart sides 59A and 59B joined by opposed ends 59C and 59D with an open top and an open bottom. The aerating guide 59 connects between the rails 55 and 57 at a mid-point along their lengths with the opposed ends 59C and 59D mounted on the inner edges of the base portions 55A and 57A of the rails 55 and 57. In this position, the aerating guide 59 is mounted between the middle legs 51A and 51B. As shown in side view in FIG. 5, when the tray rack 43 is mounted in the water tray 13, the aerating guide 59 is positioned directly above the rotatable end caps 41A and 41B of the air supply system and has a lower portion submerged in the water bath 15.

As shown in FIGS. 5 and 6, when the trays 45 are supported on the tray racks 43, which in turn are mounted in the water tray 13, the trays 45 are partially immersed in the water bath 15. This enables the temperature of the inoculated soyfood substrate 11 held by the trays 45 to be regulated during the culturing process by regulating the temperature of the water bath 15. Approximately the first half of the culturing process is endothermic (requires the absorption of heat). This is accomplished by heating the water bath 15 with heated water from the water tank 112. To introduce heated water into the water tray 13, the solenoid valve 106 opens the water line 110 in response to the sensor 132 and the controller 104. The pump 100 then moves the heated water from water tank 112, through water line 118 and into the water inlet line 19 exiting the water tray 13. Approximately the second half of the culturing of the soyfood substrate 11 is an exothermic process and the released heat will raise the temperature of the water bath 15. Thus, a sufficient amount of cooling water at 40° F. (4.4° C.) is trickled into the water bath 15 from the cold water source, as previously explained, to maintain the temperature of the water bath at between about 85° F. and 95° F. (29.4° C. and 35.0° C.) with a preferred temperature at about 89° F. (32° C.). To ensure that the inoculated soyfood substrate 11 is evenly heated by the water bath 15, the trays 45 are open receptacles having a rectangular shape in plan view with a flat bottom 45A and a low rim 45B. This gives the trays 45 a depth of approximately one inch (2.54 cm).

When a pair of the trays 45 are mounted on the tray rack 43 to form a tray unit 47, the aerating guide 59 is positioned between the side-by-side trays 45. Furthermore, when the tray unit 47 is supported in the water bath 15 (FIG. 2), the aerating guide 59 is positioned directly above the rotatable end caps 41A and 41B of the air supply system 31 with a lower portion of the aerating guide 59 immersed in the water bath 15. Also, the water bath 15 extends up the rim 45B of the trays 45 to just below the upper edge of the rim 45B. That way, the trays 45 are immersed in the water bath 15 for uniformly heating or cooling the inoculated soyfood substrate 11 held by the trays 45. The trays 45 are preferably made of stainless steel, although fiberglass, plastic materials and metal materials such as aluminum and steel are contemplated by the scope of the present invention, as long as they are approved for contact with food.

During the culturing process, a pair of trays 45 are filled with the inoculated soyfood substrate 11, as shown in FIGS. 5 and 6 and are mounted on the tray rack 43 to form a tray unit 47. The tray unit 47 is then mounted in the water tray 13 to heat the inoculated soyfood substrate 11 to the temperature of the water bath 15. Preferably there are seven (7) tray units 47 comprising fourteen (14) trays 45 aligned in parallel along the length of the water tray 13. The stainless steel trays 45 are immersed in the water bath 15 to a distance just below the upper edge of the rim 45B. Since stainless steel is a relatively poor heat conductor, this serves to uniformly heat or cool the inoculated soyfood substrate 11 over the entire areal extent of the trays 45.

To aid in controlling the temperature of the inoculated soyfood substrate 11, a removeable lid or cover 61 is mounted on each of the tray racks 43 to seal the tray units 47 in the water bath 15. As shown in perspective in FIG. 4, the cover 61 is sized to mount over a single tray unit 47 and is comprised of spaced apart sidewalls 61A and 61B depending from a top plate 61C (FIGS. 5 and 6), with opposed end walls 61D and 61E between the sidewalls 61A and 61B. The opposed end walls 61D and 61E are each provided with a pair of openings 63 that serve as air outlets from the cover 61. The openings 63 and the cover 61 along with the air supply system 31 previously described provide a sealed aerating system for aerobically culturing the inoculated soyfood substrate 11 to form the Tempeh.

Figure 4:
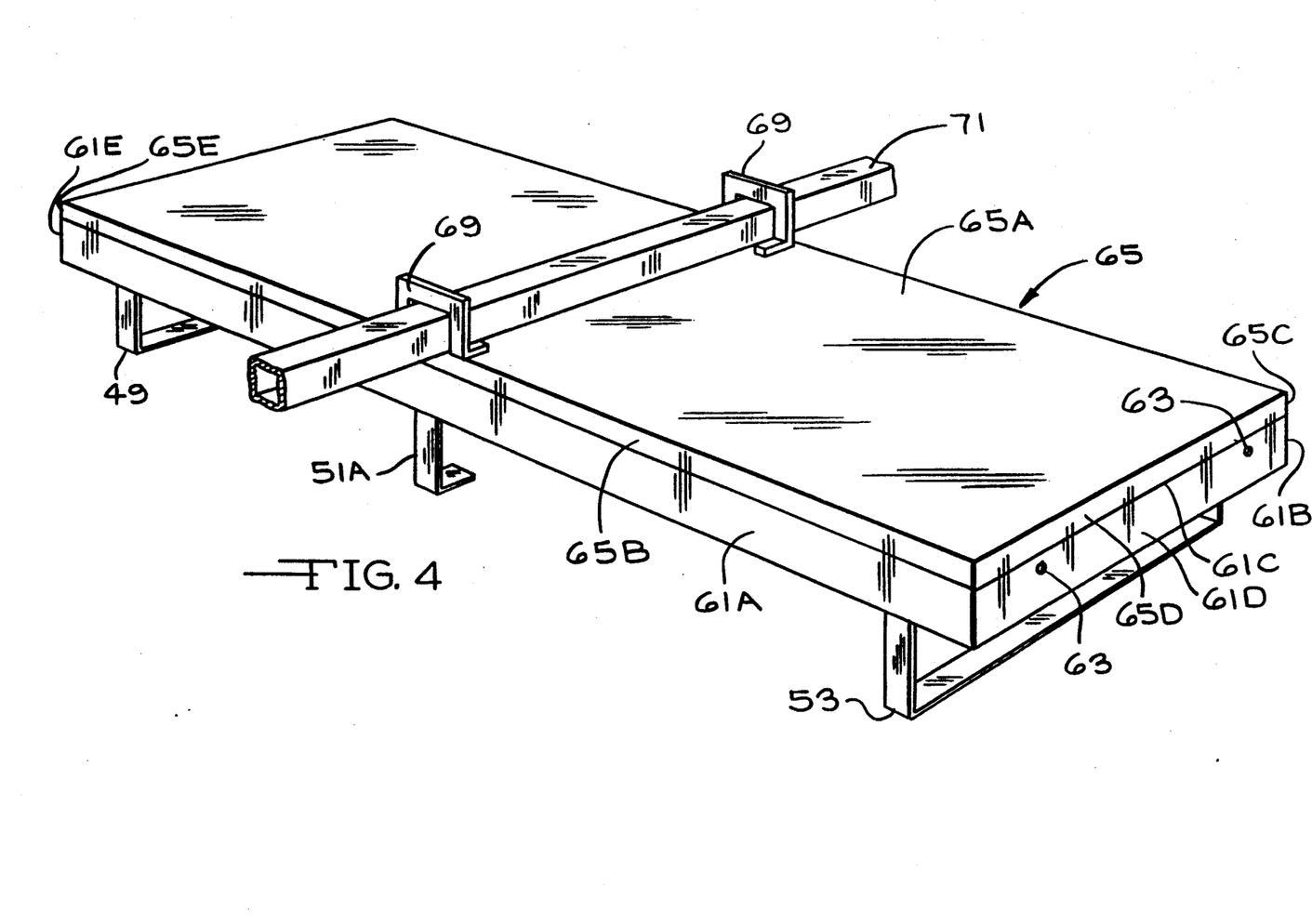
FIG. 4 is a left side perspective view of cover 61 mounted on the tray rack 43 to seal the unit 47 of side-by-side trays 45 in the water bath 15 of the incubator apparatus 10 of the present invention.

The cover 61 is further provided with an insulation box 64 that mounts on the top plate 61C of the cover 61. The insulation box 65 is comprised of a top plate 65A having spaced apart sidewalls 65B and 65C depending from the top plate 65A to the top plate 61C of the cover 61 and opposed end walls 65D and 65E extending between the sidewalls 65B and 65C. This provides for mounting an elongate block of insulation 67 inside the box 65. That way, the cover 61 along with the insulation 67 serves to retain the heat generated by the water bath 15 on the inoculated soyfood substrate 11 held in the trays 45, which are supported on the tray rack 43 and partially immersed in the water tray 13.

To move the covers 61 off and onto the tray racks 43 mounted in the water tray 13, a bar 71 is mounted through the eye holes of the handles 69 of each of the covers 61. The bar 71 is connected by a chain or other suitable means to a winch means (not shown) for raising and lowering the covers 61. This provides a means for accessing the tray racks 43 mounted in the water tray 13 so that the trays 45 holding the inoculated soyfood substrate 11 can be mounted on the tray racks 43 to partially immerse the trays 45 in the water bath 15 and for removing the trays 45 from the tray racks 43.

IN USE

The covers 61 are first removed from the tray racks 43 by the bar 71 and winch means. The trays 45 have already been loaded with the soyfood substrate 11 to a depth of about 0.5 to 0.75 inches (1.3 to 1.9 cm) and the soyfood substrate 11 has been inoculated with a beneficial mold culture, preferably *Rhizopus oligosporus*, as previously described in the Examples. A pair of trays 45 holding the inoculated soyfood substrate 11 are then mounted on each of the tray racks 43, which have previously been mounted in the water bath 13.

As shown in FIGS. 5 and 6, in this position, the trays 45 are partially immersed in the water bath 15 so that the level of the water bath 15 is just below the upper edge of the rims 45B of the trays 45. The covers 61 are then remounted on the tray racks 43 and the temperature of the water bath 15 is regulated by introducing into the water tray 13 heated water from the water tank 116. This serves to bring the temperature of the water bath to between about 85° F. and 95° F. (29.4° C. and 35.0° C.), with the preferred temperature at about 89° F. (32° C.).

A single cover 61 serves to seal a pair of side-by-side trays 45 in the water bath 15. In this position, the top plate 61C of the cover 61 is supported on the upstanding portions 49A, 51C, 51D and 53A of the leg members 49, 51A, 51B and 53 (FIG. 5). This enables the lower edge of the sidewalls 61A and 61B and the end walls 61D and 61E of the cover 61 to be submerged in the water bath 15 to seal the trays 45 in a closed environment under the cover 61. Also in this position, the rotatable end caps 41A and 41B of the air supply system 31 are positioned so that the airflow from the openings 41C is directly below and vertically in line with the aerating guide 59 portion of the tray rack 43. As shown in FIG. 5, the upper end of the aerating guide 59 is spaced about 0.125 inches (0.32 cm) below the top plate 61C of cover 61 This provides a space for the airflow from the rotatable end caps 41A and 41B to travel up through the aerating guide 59 and over the inoculated soyfood substrate 11 held in the trays 43. Since the cover 61 is sealed in the water bath 15, the airflow can only escape from the cover 61 through the openings 63 in the end walls 61D and 61E of the cover 61. The insulation box 65 mounted on the cover 61 also helps to retain the warmth of the water bath 15 on the culturing soyfood substrate 11.

Since the second half of the culturing of the soyfood substrate 11 is an exothermic process that releases heat into the water bath 15, the sensor 132 in the water tray 13 is used to signal the controller 104 via cable 134 to trickle cooling water from the cold water source into the water tray 13 to maintain the desired temperature of the water bath 15. The pump 100 has previously been turned on to circulate the warmed water bath 15 in the water tray 13 through the water inlet line 19 and back out of the water tray 13 through the water outlet line 25, as has been previously discussed. This ensures that the temperature of the water bath 15 remains uniform throughout the areal extent of the water tray 13, which provides for uniformly heating or cooling the soyfood substrate 11 held in the trays 45 supported in the water bath 15 by the tray racks 43. With the water bath 15 at a temperature of about 89° F. (31.7° C.), the temperature of the inoculated soyfood substrate 11 is between about 85° to 86° F. (29.4° to 30.0° C.).

The water tray 13 is also provided with the overflow drain line 30 (FIG. 9) that drains excess water during the culturing process. This prevents the trays 45 from floating in the water bath 15 as the water bath 15 heats up and expands, and as the cooling water from the cold water source is trickled into the water tray 13.

The closed cover 61 having the openings 63 along with the air supply system 31 comprise an aerating means that along with the regulated temperature of the water bath 15 provides an aerobic environment that promotes the growth of the *Rhizopus oligosporus* microorganisms on the soyfood substrate 11 to form the Tempeh. The *Rhizopus oligosporus* microorganisms also serve as a binding agent to hold the Tempeh together and to give the Tempeh a pleasant and meaty texture. Each tray 45 is capable of producing between about 3 to 6 pounds (1.4 kg to 2.7 kg) of Tempeh in a twenty-three (23) hour period, which is the usual culturing time for the *Rhizopus oligosporus* microorganisms. As shown in plan view in FIGS. 1 and 2, the preferred water bath 15 contains seven (7) tray units 47 comprising side-by-side trays 45 mounted on a tray rack 43. With all fourteen (14) trays 45 of the tray unit 47 loaded to an optimal weight with the inoculated soyfood substrate 11 as previously described, about 63 pounds (28.6 kg) of Tempeh can be produced in a twenty-three (23) hour period resulting for example in 30 Tempeh patties per tray, each pattie weighing about 2.4 ounces (68.5 grams).

After the inoculated soyfood substrate 11 has fully cultured to form the Tempeh, steam is moved through the steam line 17 and is used to raise the temperature of the water bath 15 to about 175° F. (79.4° C.). The temperature of the Tempeh is thereby raised to about 160° F. (71.1° C.). This serves to kill the *Rhizopus oligosporus* microorganisms and to pasteurize the Tempeh. To kill the microorganisms, the temperature of the Tempeh must be raised to a minimum of 140° F. (60° C.). If the Tempeh is scheduled for incorporation into other foods, which are to be heated above 140° F., this step can be omitted. The winch is then actuated to enable all of the covers 61 to be simultaneously removed from the racks 43 to uncover the trays 45.

It should be understood that while providing the seven (7) parallel covers 61, each covering a separate tray unit 47 is preferred, a single large cover (not shown) that mounts over all seven (7) tray units 47 comprising the fourteen (14) trays 45 supported in the water bath 15 can also be used. This single, large cover could be removed from the trays 45 by the same chain and winch system previously described.

After the temperature of the water bath 15 has been brought to a sufficiently high temperature to assure that the temperature of the Tempeh has reached at least 140° F. (60° C.), the water bath is again cooled down to 89° F. (31.7° C.) by introducing cooling water at a temperature of 40° F. (4.4° C.) into the water tray 13 from the cold water source, as previously explained. The trays 45 with the finished Tempeh are then removed from the water bath 15. New trays 45 with inoculated substrate 11 for the next batch of Tempeh are then inserted into the water bath 15 to begin the culturing process all over again. The finished Tempeh is removed from the trays 45 and can be shaped in many useful forms such as various sized patties, ribs, strips, cubes and small or large grated Tempeh. The number of recipes in which Tempeh can be used as a food is only limited by the imagination of the preparer.

The nutritional information for a 2 ounce serving of the Tempeh is:
calories—110
protein—12 grams
carbohydrates—8 grams
fat—3 grams (mostly polyunsaturated)
cholesterol—0 grams
sodium—4 milligrams Also, it is contemplated by the scope of the present invention that there can be a plurality of incubator apparatus 10 mounted one above the other in a spaced relationship. That way, a single winch means can be used to mount and remove a plurality of covers 61 from the stacked incubator apparatus 10 at the same time. Also the circulation, heating, cooling and pasteurizing can be controlled by one sensor 132 in each water tray 13 of the plurality of incubator apparatus 10. There can be three water tanks (not shown) in a boiler room, the first tank holding 190° F. (87.8° C.) water, the second tank holding 90° F. (32.2° C.) water and the third tank holding 40° F. (4.4° C.) water. Water from the respective water tanks is then introduced into the water tray 13 at the appropriate time in response to the sensor 132 which signals the controller 104 to open and close a piping system with valves that are connected to the pump 100. This would provide economics of scale for commercial production of Tempeh from the inoculated soyfood substrate 11.

Further, it is contemplated by the scope of the present invention that the temperature of the water bath 15 in the water tray 13 can be regulated by a single heater means. This can be provided by heating coil which can be mounted in the line 17. The electric heating coil can be controlled by a regulator in response to the sensor 132 to raise the temperature of the water bath from 90° F. (32.2° C.) to 190° F. (87.8° C.) to stop the culturing process by killing the microorganisms and to pasteurize the Tempeh, as has previously been discussed. Also, the heating coil 114 in water tank 112 serves this purpose. When the temperature of the water bath 15 needs to be lowered to cool the Tempeh, cooling water can be introduced into the water tray 13 from the cold water source.

It is intended that the foregoing descriptions be only illustrative of the present invention and that the present invention be limited only by the hereinafter appended claims.

I claim:

1. An apparatus adapted for culturing a plant material with a microorganism to produce a cultured food, which comprises:
   (a) an open container means adapted for holding a water bath;
   (b) shallow tray means with a flat portion surrounded by sides supported in the container means and holding a quantity of the plant material spread over the bottom of the tray means, wherein the tray means is mounted in the container means so as to be partially immersed in the water bath in the container means with the bottom of the tray means in the water bath;
   (c) heater means for evenly heating the water bath in the container means;
   (d) circulation means which evenly regulates the temperature of the water bath in the container means;
   (e) aerating means providing an airflow in the container means; and
   (f) lid means mounted in the container means and sealed over and around the tray means, the lid means having perforations that provide for the airflow from the aerating means to move over the plant material held in the tray means and out the lid means through the perforations to aerate the plant material, wherein the heater means and the circulation means maintain the water bath in the container means at a first water temperature so that the plant material is at a culturing temperature that is suitable for culturing the microorganisms while the plant material is being aerated by the airflow from the aerating means to produce the cultured food.

2. The apparatus of claim 1 wherein the circulating means is adapted to create a circulating flow of the water bath to provide for the even distribution of the temperature of the water bath in the container means.

3. The apparatus of claim 1 wherein a sensor means is mounted on the container means and is adapted to actuate the heater means to provide the evenly heated water bath in the container means.

4. The apparatus of claim 3 wherein the heater means is an electric heating coil means controlled by the sensor means to provide the evenly heated water bath in the container means.

5. The apparatus of claim 1 wherein after the culturing is completed to form the cultured food, a second heater means is provided which is adapted to raise the water bath in the container means to a second water temperature which kills the microorganisms.

6. The apparatus of claim 5 wherein the second heater means is a steam conduit means immersed in the water bath in the container means and is adapted to raise the water bath in the container means to the second water temperature to kill the microorganisms.

7. The apparatus of claim 5 wherein the second heater means is adapted to raise the water bath in the container means to the second water temperature so that the temperature of the plant material is above about 140° F. (60° C.) to kill the microorganisms.

8. The apparatus of claim 5 wherein the second heater means produces the second water temperature which pasteurizes the cultured food.

9. The apparatus of claim 1 wherein the heater means is an electric heating coil means that is adapted to regulate the water bath between the first water temperature and a second water temperature, which kills the microorganisms.

10. The apparatus of claim 1 wherein the tray means are removeable from the container means.

11. The apparatus of claim 1 wherein the tray means are adapted for the growth of the microorganisms which are selected from the genus Rhizopus.

12. The apparatus of claim 1 wherein the lid means is provided with insulation means so that when the lid means is mounted over the tray means, the lid means retains the heat generated by the heater means in the water bath in the container means to maintain the plant material at the culturing temperature that is suitable for culturing the microorganisms.

13. The apparatus of claim 1 wherein the container means is comprised of an elongate, rectangular bottom plate having opposed sidewalls and end walls between the sidewalls extending upward from the bottom plate and wherein the lid means is comprised of an elongate, rectangular top plate with opposed sidewalls depending from the top plate and with end walls between the sidewalls of the lid means, and wherein the lid means is mounted in the container means to cover the tray means with the sidewalls and end walls of the lid means partially immersed in the water bath in the container means to seal the lid means over and around the tray means.

14. The apparatus of claim 1 wherein the heater means is adapted so that the plant material is cultured at the culturing temperature of between about 85° F. and 95° F. for between about 21 to 23 hours.

15. The apparatus of claim 1 wherein the tray means is made of a metal material.

16. The apparatus of claim 15 wherein the metal material is a stainless steel.

17. The apparatus of claim 1 wherein the tray means is supported in the container means on a rack means mounted in the container means, and wherein each rack means supports a unit of side-by-side tray means partially immersed in the water bath in the container means, wherein multiple lid means are provided one for each unit of the rack means and the lid means are supported by the rack means and wherein the aerating means is positioned between the side-by-side tray means supported on each of the rack means so that the airflow from the aerating means moves over the plant material held in the side-by-side tray means and out through the perforations in the lid means for culturing the plant material held in the tray means to form the cultured food.

18. The apparatus of claim 17 wherein the perforations through the lid means are provided adjacent to each of the tray means so that the airflow from the aerating means moves over the plant material held in the tray means to provide for aerobically culturing the plant material held in the tray means to form the cultured food.

19. The apparatus of claim 17 wherein there are at least two units of parallel, side-by-side tray means mounted on individual rack means mounted in the container means with individual lid means supported by the rack means to cover each of the units of tray means and wherein each of the individual lid means is provided with a hanger means connectible to a winch means for removing the lid means from covering the units of tray means so that the tray means can be removed from the container means.

20. The apparatus of claim 19 wherein at least two adjacent lid means are linked together with the hanger means and wherein the winch means provides for simultaneously removing the two lid means from the two units of side-by-side tray means.

21. The apparatus of claim 1 wherein the tray means are about 1.3 to 3.8 cm in depth to the bottom of the tray means and the plant material is filled in the tray means to a depth of about 0.6 to 1.9 cm.

22. The apparatus of claim 1 wherein the plant material is comprised of soybeans and the cultured food is Tempeh.

* * * * *